United States Patent
Ogura et al.

(10) Patent No.: US 9,120,526 B2
(45) Date of Patent: Sep. 1, 2015

(54) FRONT FORK

(71) Applicant: KAYABA INDUSTRY CO., LTD., Tokyo (JP)

(72) Inventors: Hideaki Ogura, Kani (JP); Kazuto Shindo, Gifu (JP); Takaaki Nakano, Kani (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/105,829

(22) Filed: Dec. 13, 2013

(65) Prior Publication Data

US 2014/0167380 A1    Jun. 19, 2014

(30) Foreign Application Priority Data

Dec. 14, 2012  (JP) ................................ 2012-273198

(51) Int. Cl.
*F16F 9/36* (2006.01)
*B62K 25/08* (2006.01)
*F16F 9/00* (2006.01)

(52) U.S. Cl.
CPC .. *B62K 25/08* (2013.01); *F16F 9/00* (2013.01)

(58) Field of Classification Search
CPC ........ F16F 9/36; F16J 15/56; B62K 2025/048
USPC ........... 280/276, 275; 277/564, 569; 188/313, 188/322.17
See application file for complete search history.

(56) References Cited

U.S. PATENT DOCUMENTS

| 2,168,818 | A | * | 8/1939 | Condon | 277/553 |
| 2,437,900 | A | * | 3/1948 | Winkeljohn | 277/576 |
| 4,676,518 | A | * | 6/1987 | Kartchner et al. | 280/276 |
| 6,279,914 | B1 | * | 8/2001 | Yamanaka et al. | 277/569 |
| 6,334,618 | B1 | * | 1/2002 | Ohta et al. | 277/549 |
| 6,431,301 | B1 | * | 8/2002 | Forbes | 180/185 |
| 6,557,857 | B1 | * | 5/2003 | Goodman | 277/549 |
| 6,820,729 | B2 | * | 11/2004 | Verriet | 188/322.17 |

(Continued)

FOREIGN PATENT DOCUMENTS

| JP | 2007064277 A | * | 3/2007 |
| JP | 2010-164167 A | | 7/2010 |

(Continued)

OTHER PUBLICATIONS

"2010 Ural Patrol T Test Ride," by Basem Wasef, Popular Mechancics, available at http://www.popularmechanics.com/cars/motorcycles/reviews/2010-ural-patrol-t-test-ride (May 6, 2010).*

*Primary Examiner* — Kevin Hurley
*Assistant Examiner* — Gabriela C Craciun
(74) *Attorney, Agent, or Firm* — Rabin & Berdo, P.C.

(57) ABSTRACT

A front fork includes a fork body having an outer tube and an inner tube relatively movably inserted into the outer tube in an axial direction, a damper housed in the fork body to dampen relative movement between the outer and inner tubes, a biasing member that biases the fork body in an expansion direction at all times, an annular dust seal that is held in the outer tube and makes sliding contact with an outer circumference of the inner tube, an annular oil seal that is held in the outer tube inside the fork body to be inner than the dust seal and makes sliding contact with the outer circumference of the inner tube, and a C-shaped scraper that is provided between the dust seal and the oil seal and makes sliding contact with the outer circumference of the inner tube.

11 Claims, 6 Drawing Sheets

(56) References Cited

U.S. PATENT DOCUMENTS

| | | | |
|---|---|---|---|
| 7,686,308 B2 * | 3/2010 | Van Schoor | 277/551 |
| 2006/0006608 A1 * | 1/2006 | LaPlante et al. | 277/569 |
| 2006/0170185 A1 * | 8/2006 | Takahashi et al. | 280/276 |
| 2007/0057472 A1 * | 3/2007 | Hatch | 277/569 |
| 2008/0258406 A1 * | 10/2008 | Dahlheimer | 277/569 |
| 2012/0187651 A1 * | 7/2012 | Wimmer | 280/276 |
| 2013/0134688 A1 * | 5/2013 | Mochizuki et al. | 280/276 |
| 2013/0257011 A1 * | 10/2013 | Murakami et al. | 280/276 |
| 2013/0313803 A1 * | 11/2013 | Kwaterski | 280/276 |
| 2014/0216872 A1 * | 8/2014 | Kani et al. | 188/322.16 |

FOREIGN PATENT DOCUMENTS

| | | | |
|---|---|---|---|
| JP | 2011-252590 A | | 12/2011 |
| JP | 2012159121 A | * | 8/2012 |

* cited by examiner

FRONT FORK

TECHNICAL FIELD

The present invention relates to a front fork interposed between a chassis and an axle of a saddle type vehicle.

BACKGROUND ART

In general, a front fork interposed between a chassis and an axle of a saddle type vehicle such as a motorcycle includes a telescopic fork body having an outer tube and an inner tube inserted into the outer tube in an axial direction such that they can move relatively, and a damper housed in the fork body. The damper expands and retracts along with the fork body to produce a damping force, and this damping force dampens a vibration of the chassis.

In the front fork described above, the fork body internally has a suspension spring that biases the fork body in an expansion direction so that a weight of the chassis is elastically supported by the suspension spring. In recent years, a lightweight front fork has been developed, in which an air spring is employed as the suspension spring (for example, refer to JP 2010-164167 A and JP 2011-252590 A).

In the front fork including an air spring as a suspension spring as described above, if a gas leaks out of the fork body, the spring force exerted by the air spring for supporting the chassis is eliminated. Therefore, it is important to hermetically seal the fork body.

In an inner circumference of the outer tube, there is installed a cylindrical bushing that makes sliding contact with the inner tube to guide movement of the inner tube relative to the outer tube in an axial direction. For lubricating the bushing, a lubricant is filled in a gap between the inner tube and the outer tube.

For this reason, the front fork described above includes an annular dust seal held in an inner circumference of the outer tube to make sliding contact with an outer circumference of the inner tube, and an annular oil seal held in the inner circumference of the outer tube to be inner than the dust seal inside the fork body and make sliding contact with the outer circumference of the inner tube.

The oil seal scrapes off the lubricant adhering to the outer circumference of the inner tube to prevent the lubricant and the gas from leaking out of the fork body. The dust seal scrapes off a foreign object such as dust, mud, and water adhering to the outer circumferential surface of the inner tube to prevent a foreign object from being mixed inside the fork body and protect the sliding surface of the inner tube or the oil seal from a foreign object.

SUMMARY OF INVENTION

However, when the front fork described above is employed in a saddle type vehicle running in an off-road environment, and minute mud particles adhering to the inner tube during running is dried and solidified as time elapses, it is difficult to scrape off the dried mud using the dust seal, and the mud may reach the oil seal over the dust seal. In addition, if intrusion of a foreign object is prevented by increasing a tightening force of the dust seal, this may hinder smooth movement of the inner tube relative to the outer tube.

It is therefore an object of the present invention to provide a front fork capable of protecting the oil seal by scraping off a foreign object adhering to the inner tube without hindering smooth movement of the inner tube relative to the outer tube.

According to one aspect of the present invention, a front fork includes a fork body having an outer tube and an inner tube relatively movably inserted into the outer tube in an axial direction, a damper housed in the fork body to dampen relative movement between the outer and inner tubes, a biasing member that biases the fork body in an expansion direction at all times, an annular dust seal that is held in the outer tube and makes sliding contact with an outer circumference of the inner tube to prevent intrusion of a foreign object into the fork body, an annular oil seal that is held in the outer tube inside the fork body to be inner than the dust seal and makes sliding contact with the outer circumference of the inner tube to prevent leakage of an actuating liquid contained in the fork body, and a C-shaped scraper that is provided between the dust seal and the oil seal and makes sliding contact with the outer circumference of the inner tube.

DESCRIPTION OF EMBODIMENTS

Hereinafter, a front fork according to an embodiment of the invention will be described with reference to the accompanying drawings.

Figure 1:
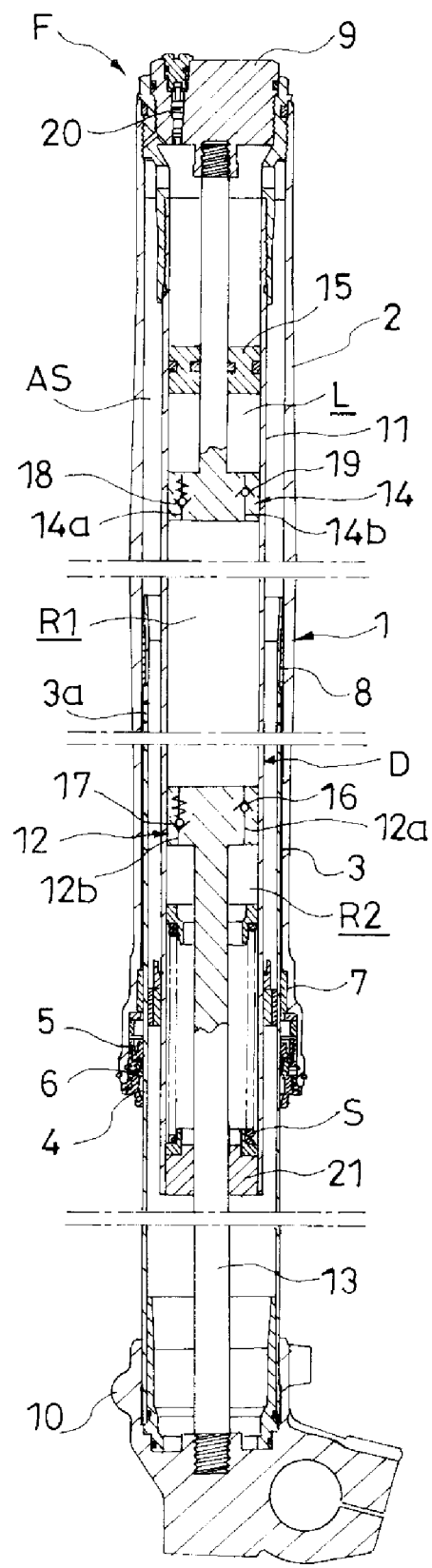
FIG. 1 is a longitudinal cross-sectional view illustrating a front fork according to an embodiment of the invention.

Referring to FIG. 1, the front fork F according to this embodiment includes a fork body 1 having an outer tube 2 and an inner tube 3 inserted into the outer tube 2 in an axial direction such that they can move relatively, a damper D housed in the fork body 1 to dampen relative movement between the outer tube 2 and the inner tube 3, an air spring AS serving as a biasing member for biasing the fork body 1 in an expansion direction at all times, an annular dust seal 4 held in the outer tube 2 to make sliding contact with the outer circumference of the inner tube 3, an annular oil seal 5 held in the outer tube 2 to be inner than the dust seal 4 inside the fork body 1 and make sliding contact with the outer circumference of the inner tube 3, and a scraper 6 provided between the dust seal 4 and the oil seal 5 to make sliding contact with the outer circumference of the inner tube 3. When the front fork F expands or contracts by an external force, the expansion or contraction is dampened by a damping force generated by the damper D. For example, the front fork F is interposed between a chassis and an axle (not illustrated) of a saddle type vehicle to dampen a vibration of the chassis and elastically support the chassis by virtue of the spring force of the air spring AS.

Hereinafter, a description will be made for each part. The outer tube 2 has a tubular shape whose upper end is closed in FIG. 1. The inner tube 3 has a tubular shape whose lower end is closed in FIG. 1. The inner tube 3 has an opening end side corresponding to an upper side in FIG. 1 inserted into the inside of the outer tube 2 and is relatively movable relative to the outer tube 2 in a vertical direction in FIG. 1 as an axial direction. In addition, a tubular bushing 7 making sliding contact with the outer circumference of the inner tube 3 is installed in the inner circumference of the outer tube 2, and a bushing 8 making sliding contact with the inner circumference of the outer tube 2 is installed in the outer circumference in the upper end of the inner tube 3 in FIG. 1. In order to allow the inner tube 3 to relatively move relative to the outer tube 2 in the axial direction, the bushings 7 and 8 guide movement of the inner tube 3 so that the inner tube 3 can smoothly move relative to the outer tube 3 without a rattle.

The outer tube 2 and the inner tube 3 form a fork body 1, and a space is formed between the outer tube 2 and the inner tube 3 inside the fork body 1.

A damper D is housed in the aforementioned space, that is, inside the fork body 1. The damper D includes a cylinder 11 fixed to a head cap 9 that blocks the upper end of the outer tube 2, a piston 12 slidably inserted into the inside of the cylinder 11 to partition the inside of the cylinder 11 into an upper chamber R1 and a lower chamber R2, a piston rod 13 connected to the piston 12 and a bottom cap 10 that blocks the lower end of the inner tube 3 and movably inserted into the inside of the cylinder 11, a base valve 14 that defines an upper end of the upper chamber R1 inside the cylinder 11, and an annular free piston 15 slidably inserted into the upper side of FIG. 1 relative to the base valve 14 inside the cylinder 11 to form a liquid reservoir L with the base valve 14. A hydraulic fluid as an actuating liquid is filled in the upper chamber R1, the lower chamber R2, and the liquid reservoir L, and the upper side in FIG. 1 relative to the free piston 15 inside the cylinder 11 is opened to the space other than the damper D inside the fork body 1. It is noted that the actuating liquid may include water, a water solution, and the like instead of the hydraulic fluid.

The piston rod 13 is slidably and pivotably supported by the annular rod guide 21 that blocks the lower end of the cylinder 11 in FIG. 1 so that it can relatively move relative to the cylinder 11 in the axial direction corresponding to a vertical direction of FIG. 1.

The piston 12 is provided with passages 12a and 12b that cause the upper and lower chambers R1 and R2 to communicate with each other. The passage 12a is provided with a check valve 16 that allows only for a flow of the hydraulic fluid from the upper chamber R1 to the lower chamber R2, and the passage 12b is provided with a damping valve 17 that allows only for a flow of the hydraulic fluid from the lower chamber R2 to the upper chamber R1 and exerts resistance to the flow of the passing hydraulic fluid.

The base valve 14 is provided with passages 14a and 14b that cause the upper chamber R1 and the liquid reservoir L to communicate with each other. The passage 14a is provided with a damping valve 18 that allows only for a flow of the hydraulic fluid from the upper chamber R1 to the liquid reservoir L and exerts resistance to the flow of the passing hydraulic fluid, and the passage 14b is provided with a check valve 19 that allows only for a flow of the hydraulic fluid from the liquid reservoir L to the upper chamber R1.

The damping valves 17 and 18 may be a variable damping valve capable of adjusting a pressure loss for the flow rate or a passive damping valve incapable of adjusting a pressure loss for the flow rate. Although not illustrated in the drawings, when a variable damping valve is employed as the damping valves 17 and 18, for example, the damping valves 17 and 18 may include a valve seat provided in the middle of the passages 12b and 14a, a valve body that seats or unseats on/from the valve seat, and a biasing member that biases the valve body to force the valve body to seat on the valve seat. In this configuration, the biasing force of the biasing member for biasing the valve body may be adjusted by manipulating an operation rod (not illustrated) to change resistance applied to the flow of the hydraulic fluid passing through the damping valves 17 and 18. Alternatively, the damping valves 17 and 18 may be a variable aperture including a valve seat provided in the middle of the passages 12b and 14a, and a valve body that controls the apertures of the passages 12b and 14a in combination with the valve seat, so that the valve body is displaced relative to the valve seat by manipulating the operation rod to adjust apertures of the passages 12b and 14a. It is noted that the configurations of the damping valves 17 and 18 are not limited thereto. Alternatively, instead of the check valves 16 and 19, damping valves may be provided in the passages 12a and 14b.

When the damper D expands, the hydraulic fluid moves from the compressed lower chamber R2 to the expanding upper chamber R1 through the passage 12b. In this case, the damping valve 17 exerts resistance to the flow of hydraulic fluid. Therefore, a pressure difference is generated between the lower chamber R2 and the upper chamber R1, and the damper D exerts a damping force resistant to the expansion. In this expansion process, the piston rod 13 is withdrawn from the inside of the cylinder 11. Therefore, a hydraulic fluid corresponding to a volume of the piston rod 13 withdrawn from the inside of the cylinder 11 is supplied from the liquid reservoir L to the upper chamber R1 through the passage 14b of the base valve 14 to compensate for the volume.

When the damper D contracts, the hydraulic fluid moves from the compressed upper chamber R1 to the expanding lower chamber R2 through the passage 12a. In the contraction process, the piston rod 13 intrudes into the cylinder 11. Therefore, a hydraulic fluid corresponding to the volume of the piston rod 13 intruding into the cylinder 11 is discharged from the upper chamber R1 through the passage 14a of the base valve 14, and the liquid reservoir L absorbs the hydraulic fluid discharged as the free piston 15 moves upward in FIG. 1 inside the cylinder 11. In this case, resistance is exerted to the flow of the hydraulic fluid passing through the passage 14a. Therefore, the pressure of the upper chamber R1 increases, and a force pushing the piston rod 13 from the cylinder 11 increases so as to exert a damping force for hindering contraction of the damper D.

A space around the damper D inside the fork body 1 is filled with a gas to make the internal pressure equal to or higher than the atmospheric pressure. Therefore, the fork body 1 serves as a container for encapsulating the gas, and an air spring AS is formed as the biasing member. The air spring AS exerts a spring force that biases the fork body 1 to an expanding direction at all times. As the fork body 1 contracts, the gas in the fork body 1 is compressed to increase a spring force. Alternatively, as the biasing member, any type of springs may be employed instead of the air spring AS if it can bias the fork body 1 in an expansion direction. According to this embodiment, a valve 20 is provided in the head cap 9 so that a gas can be filled in the fork body 1 through the valve 20. According to this embodiment, an upper side with respect to the free piston 15 inside the cylinder 11 of the damper D in FIG. 1 is opened to the space other than the damper D. Therefore, a part of the cylinder 11 contributes to a volume of the air spring AS. As a result, a margin for arranging the valve 20 used to fill the gas in the air spring AS in the head cap 9 increases. In addition, a gas may be separately filled by closing a space located in an upper side than the free piston 15 inside the cylinder 11 without being opened to the inside of the air spring AS.

The air spring AS exerts a spring force that biases the fork body 1 in an expanding direction as described above. However, for a reactive force necessary to fully contract the fork body 1, the air spring AS is required to exert a significantly high spring force even when the fork body 1 fully expands. For this reason, while a chassis and a driver of a saddle type vehicle are supported only by the air spring AS, the spring force becomes excessive so that a driver may feel uncomfortable.

In this regard, the front fork F is provided with a balance spring S that exerts a spring force against the spring force of the air spring AS until the fork body 1 travels by a predetermined length of the stroke from the fully expanding state.

The balance spring S is fixed to the rod guide 21 provided in the lower end of the cylinder 11 in FIG. 1 and abuts on the piston 12 as the piston 12 travels downward such that the fork body 1 expands from the position of FIG. 1. As the piston 12 further moves downward, the balance spring S is compressed to exert a spring force that dampens the downward movement of the piston 12. It is noted that the balance spring S is fully compressed when the fork body 1 fully expands.

In the air spring AS, the volume is inversely proportional to the spring force. However, if the balance spring S exerts a spring force against the spring force of the air spring AS, a resultant force between the spring force of the air spring AS and the spring force of the balance spring S is substantially proportional to the stroke length of the fork body 1.

As a result, while a chassis and a driver of a saddle type vehicle are supported, the resultant force is balanced to a reasonable magnitude, and a comfortable driving feeling can be obtained without an uncomfortable cushioning feeling. When the front fork F fully contracts, the balance spring S does not exert a spring force against the spring force of the air spring AS. Therefore, the air spring AS exerts a high spring force that suppresses full contraction of the front fork F so that it is possible to prevent the front fork F from bottoming out.

In addition to the gas, a hydraulic fluid is also filled in the fork body 1. The hydraulic fluid flows to an annular gap between the outer and inner tubes 2 and 3 via an orifice 3a provided in the inner tube 3 to lubricate the sliding surfaces of the bushings 7 and 8.

Figure 2:
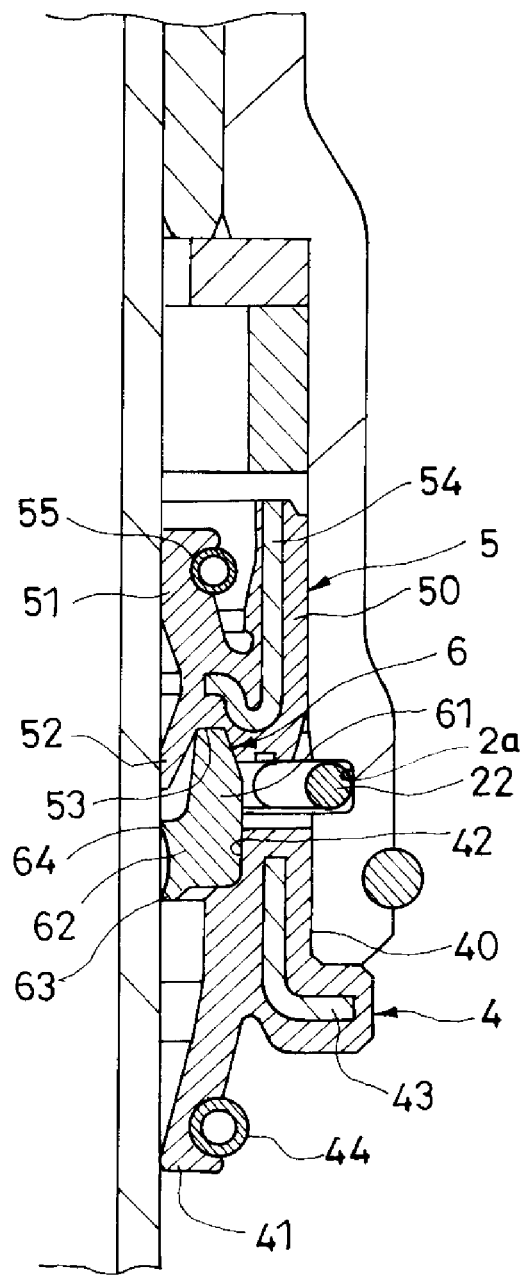
FIG. 2 is a partially enlarged longitudinal cross-sectional view illustrating the front fork according to an embodiment of the invention.

The dust seal 4 is held in the inner circumference in the opening edge which is a lower end of the outer tube 2 in FIG. 1 and makes sliding contact with the outer circumference of the inner tube 3. More specifically, as illustrated in FIG. 2, the dust seal 4 includes an annular dust seal body 40 fixedly fitted to the inner circumference of the opening edge of the outer tube 3, an annular dust lip 41 that protrudes from the inner circumference located in the lower side of FIG. 2 corresponding to the atmosphere side of the dust seal body 40 and makes sliding contact with the inner circumference of the inner tube 3, and an annular concave portion 42 provided in the inner circumference of the dust seal body 40 located in the upper side of FIG. 2 corresponding to the inner side of the fork body 1. When the inner tube 3 relatively moves toward the inside of the outer tube 2, the dust lip 41 scrapes off a foreign object such as dust, mud, and water adhering to the outer circumference of the inner tube 3 to prevent a foreign object from intruding into the fork body 1.

The dust seal body 40 internally has an annular insert metal 43 to robustly fix the dust seal to the outer tube 2 resisting to insertion into the outer tube 2.

A garter spring 44 is provided in a rear side of the sliding surface of the dust lip 41. As a result, it is possible to increase a tightening force of the dust lip 41 for pressing the inner tube 3. This allows the dust lip 41 to easily scrape off a foreign object.

The oil seal 5 is held in an inner circumference of the outer tube 2 in the lower end of FIG. 1 to be inner than the oil seal 4 inside the fork body 1. The oil seal 5 makes sliding contact with the outer circumference of the inner tube 3 to prevent leakage of the hydraulic fluid from the inside of the fork body 1. As illustrated in FIG. 2, a gap is provided between the oil seal 5 and the dust seal 4 in the axial direction, and a stopper 22 is installed in an annular trench 2a provided in the inner circumference of the outer tube 2 in order to prevent movement of the oil seal 5 in the axial direction.

More specifically, as illustrated in FIG. 2, the oil seal 5 includes an annular oil seal body 50 fixedly fitted to the inner circumference of the opening edge of the outer tube 3, an annular oil lip 51 that protrudes from the inner circumference side of the oil seal body 50 and makes sliding contact with the inner circumference of the inner tube 3, an annular sub-lip 52 that protrudes from the inner circumference side of the oil seal body 50 and makes sliding contact with the inner circumference of the inner tube 3 in a side closer to the atmosphere than the oil lip 51, and an annular trench 53 provided between the sub-lip 52 and the oil seal body 50 in the atmosphere side end. As the inner tube 3 relatively moves in an extraction direction out of the outer tube 2, the oil lip 51 scrapes off the hydraulic fluid adhering to the outer circumference of the inner tube 3. When the inner tube 3 relatively moves in an intrusion direction into the outer tube 2, the sub-lip 52 scrapes off a foreign object adhering to the outer circumference of the inner tube 3.

The oil seal body 50 internally has an annular insert metal 54 so that it can be robustly fixed to the outer tube 2 resisting to insertion into the outer tube 2.

In addition, a garter spring 55 is provided in the rear side of the sliding surface of the oil lip 51. As a result, it is possible to increase a tightening force of the oil lip 51 for pressing the inner tube 3 to allow the oil lip 51 to easily scrape off the hydraulic fluid.

The scraper 6 is nipped by the dust seal 4 and the oil seal 5 and is arranged between the dust seal 4 and the oil seal 5. The scraper 6 makes sliding contact with the outer circumference of the inner tube 3 to scrape off a foreign object adhering to the outer circumference of the inner tube 3.

Figure 3:
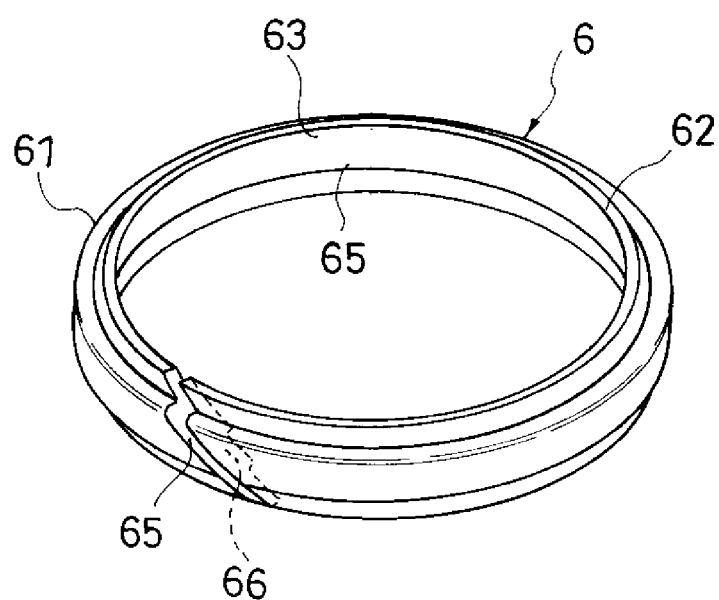
FIG. 3 is a perspective view illustrating a scraper of the front fork according to an embodiment of the invention.

As illustrated in FIGS. 2 and 3, the scraper 6 has a C-shape and is made of a synthetic resin harder than the dust seal 4. The scraper 6 includes an outer ring portion 61 nipped by the dust seal 4 and the oil seal 5 and a scraping portion 62 provided in the inner circumference of the outer ring portion 61 to make sliding contact with the outer circumference of the inner tube 3. In addition, the scraping portion 62 is provided with a spatula-like sliding contact portions 63 and 64 protruding to the inner tube 3 side in the upper and lower ends in FIG. 2 so that it can scrape off a foreign object firmly adhering to the outer circumference of the inner tube 3 using the sliding contact portions 63 and 64.

Both the circumferential ends of the scraper 6, that is, the meshing portions 65 and 66 in both ends of the circumferential direction of the outer ring portion 61 and the scraping portion 62 are inclined with respect to the axial direction of the scraper 6 while end surfaces thereof are arranged in parallel with each other, as illustrated in FIG. 3.

A shape of the outer ring portion 61 from the outer circumference in the dust seal 4 side to the lower end of FIG. 2 matches the annular concave portion 42 provided in the inner circumference of the dust seal 4. A shape of the outer ring portion 61 from the outer circumference in the oil seal 5 side to the upper end of FIG. 2 matches the annular trench 53 provided in the inner circumference of the oil seal 5. In addition, when the scraper 6 is nipped by the dust seal 4 and the oil seal 5, the portion of the outer ring portion 61 from the outer circumference in the dust seal 4 side to the lower end in FIG. 2 abuts on the annular concave portion 42 of the dust seal 4, and the portion of the outer ring portion 61 from the outer circumference in the oil seal 5 side to the upper end in FIG. 2 abuts on the annular trench 53 of the oil seal 5. That is, the shape of the scraper 6 from the outer circumference in the dust seal 4 side to the lower end in FIG. 2, abutting on the dust seal 4, matches the shape of the annular concave portion 42 of the dust seal 4 abutting on the scraper 6. In addition, the shape of the scraper 6 from the outer circumference in the oil seal 5 side to the upper end in FIG. 2, abutting on the oil seal 5, matches the shape of the annular trench 53 of the oil seal 5, abutting on the scraper 6.

Therefore, as the upper and lower ends of the scraper 6 are nipped by the dust seal 4 and the oil seal 5, the scraper 6 is fixed not to move in a vertical direction of FIG. 2, that is, the axial direction. In addition, the outer circumference in the dust seal 4 side and the outer circumference in the oil seal 5 side are bound by the dust seal 4 and the oil seal 5. Therefore, diameter expansion is prevented, and the sliding contact portions 63 and 64 abut on the inner tube 3 with a suitable tightening force. It is noted that the synthetic resin of the scraper 6 may include, for example, fluororesin such as polytetrafluoroethylene.

In the aforementioned configuration of the front fork F, the damper D exerts a damping force in the contraction or expansion process to dampen the contraction or expansion. Therefore, it is possible to suppress a vibration in a chassis of a saddle type vehicle.

Since the scraper 6 can scrape off even a foreign object that firmly adheres to the outer circumference of the inner tube 3 and is not scraped off by the dust seal 4 as the inner tube 3 intrudes into the outer tube 2, it is possible to prevent a foreign object from reaching the oil seal 5 and protect the sliding surface between the oil seal 5 and the inner tube 3. Therefore, using the front fork F according to this embodiment, it is possible to scrape off a foreign object adhering to the inner tube 3 to protect the oil seal 5.

Since the scraper 6 has a C-shape, it can be easily installed in the inner tube 3 and does not exert an excessive tightening force. Therefore, the scraper 6 does not hinder a relative movement of the inner tube 3 relative to the outer tube 2 in the axial direction. Accordingly, the front fork F can smoothly contract or expand.

In the front fork F according to this embodiment, the scraper 6 is nipped by the dust seal 4 and the oil seal 5 and is fixed not to move relative to the outer tube 2 in the axial direction. Therefore, even when the scraper has a C-shape, it does not follow the outer circumference of the inner tube 3 and can scrape off a foreign object adhering to the outer circumference of the inner tube 3. In addition, since the scraper does not collide with the dust seal 4 and the oil seal 5, it does not expedite deterioration of the dust seal 4 and the oil seal 5.

In the front fork F according to this embodiment, the scraper 6 is nipped by the dust seal 4 and the oil seal 5. Therefore, even when the scraper 6 has a C-shape, both ends in the circumferential direction can approach each other to suppress diameter expansion. Accordingly, it is possible to sufficiently give a tightening force for pressing the inner tube 3 to the scraper 6 and easily scrape off or remove a foreign object adhering to the outer circumference of the inner tube 3. Furthermore, the tightening force can be adjusted by setting an outer diameter of the scraper 6 or a diameter of the abutting surface of the dust seal 4 or the oil seal 5 on the outer circumference of the scraper 6. Therefore, if a plurality of scrapers 6 having different diameters are prepared in advance, it is possible to easily tune the tightening force.

In the front fork F according to this embodiment, the scraper 6 is nipped by the dust seal 4 and the oil seal 5 so that movement in the axial direction and diameter expansion are suppressed. Therefore, even when a load is applied to the scraper 6 in a radial direction or a thrust direction, both the facing circumferential ends of the scraper 6 are not opened in an axial direction or a radial direction. Therefore, a foreign object adhering to the outer circumference of the inner tube 3 is effectively scraped off. It is noted that the shape of the outer ring portion 61 of the scraper 6 from the outer circumference in the dust seal 4 side to the lower end in FIG. 2 matches the shape of the annular concave portion 42 provided in the inner circumference of the dust seal 4. The shape of the outer ring portion 61 from the outer circumference of the oil seal 5 side to the upper end in FIG. 2 matches the shape of an annular trench 53 provided in the inner circumference of the oil seal 5. Therefore, even when a heavy load is applied to the scraper 6 from the radial direction or the thrust direction, the scraper 6 can be reliably nipped by the dust seal 4 and the oil seal 5. Accordingly, it is possible to improve a foreign object scraping effect.

The meshing portions 65 and 66 in both circumferential ends of the scraper 6 are arranged in parallel with each other and are inclined with respect to the axial direction of the scraper 6. Therefore, even when there is a gap between the meshing portions 65 and 66, the scraper 6 scrapes off a foreign object as the inner tube 3 moves along the axial direction. Accordingly, it is possible to prevent a foreign object from reaching the oil seal 5.

Figure 4:
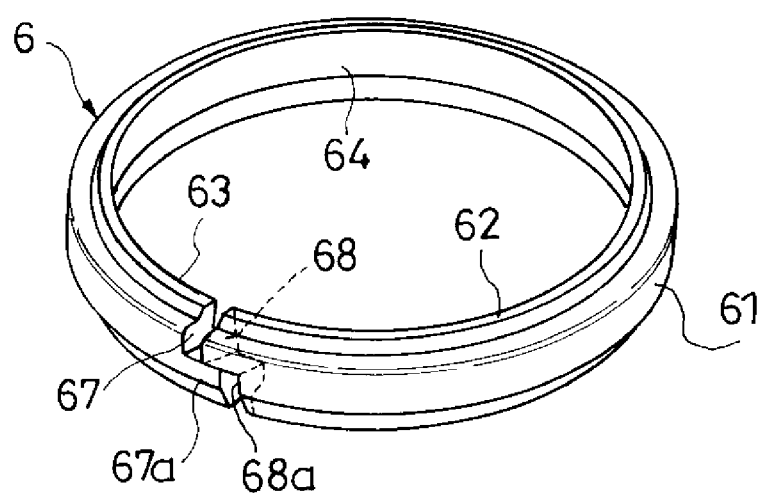
FIG. 4 is a perspective view illustrating a modification of the scraper.

It is noted that the meshing portions in both circumferential ends of the scraper 6 may be shaped such that the convex portion 67a provided in one of the meshing portions 67 meshes with the concave portion 68a provided in the other meshing portion 68 as illustrated in FIG. 4. In this shape, even when there is a gap between the meshing portions 67 and 68, the gap is not exposed to the other side of the scraper 6 as seen in the axial direction. Therefore, it is possible to prevent a foreign object from passing therethrough.

Figure 5:
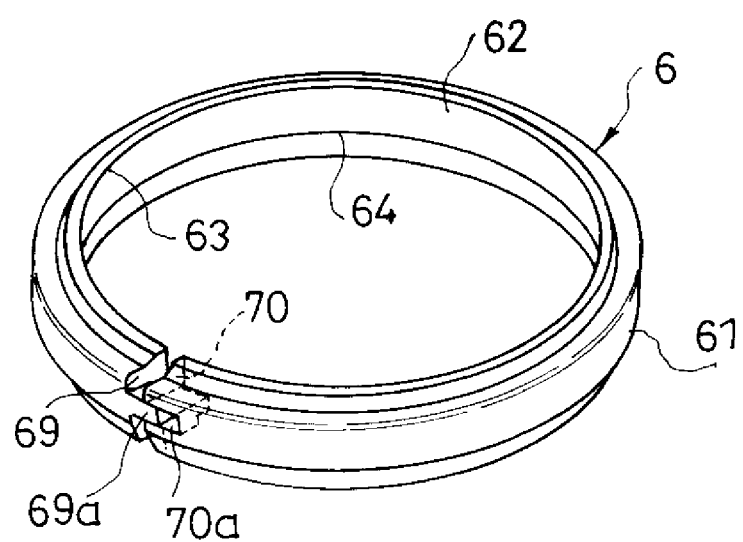
FIG. 5 is a perspective view illustrating another modification of the scraper.

Alternatively, in order to prevent the other side of the scraper 6 from being exposed through a gap as seen in the axial direction even when there is the gap between the meshing portions 67 and 68, a convex portion 69a may be provided in the center of the meshing portion 69, and a concave portion 70a that receives the convex portion 69a may be provided in the center of the meshing portion 70 as illustrated in FIG. 5. Therefore, it is possible to prevent a foreign object from passing through the scraper 6.

Figure 6:
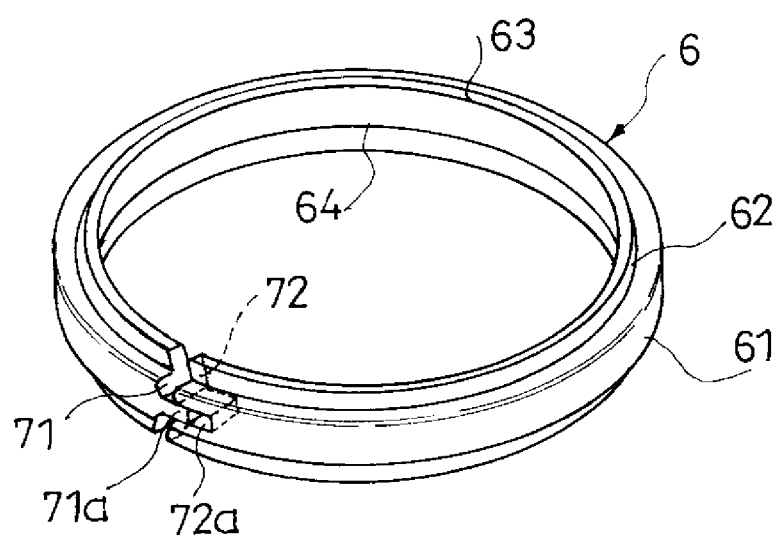
FIG. 6 is a perspective view illustrating further another modification of the scraper.

Alternatively, in order to prevent a foreign object from passing through the scraper 6, parallel portions inclined with respect to the axial direction of the scraper 6 may be provided in a part of a meshing portion 71 having a convex portion 71a and a part of a meshing portion 72 having a concave portion 72a as illustrated in FIG. 6. In this case, since only a part of meshing portions 71 and 72 may be inclined, the inclined portion may be provided in anywhere of the meshing portions 71 and 72.

Embodiments of this invention were described above, but the above embodiments are merely examples of applications of this invention, and the technical scope of this invention is not limited to the specific constitutions of the above embodiments.

With respect to the above description, the contents of application No. 2012-273198, with a filing date of Dec. 14, 2012 in Japan, are incorporated herein by reference.

The invention claimed is:

1. A front fork comprising:
   a fork body having an outer tube and an inner tube relatively movably inserted into the outer tube in an axial direction;

a damper housed in the fork body to dampen relative movement between the outer and inner tubes;

a biasing member that biases the fork body in an expansion direction at all times;

an annular dust seal that is held in the outer tube and makes sliding contact with an outer circumference of the inner tube to prevent intrusion of a foreign object into the fork body;

an annular oil seal that is held in the outer tube inside the fork body to be inner than the dust seal and makes sliding contact with the outer circumference of the inner tube to prevent leakage of an actuating liquid contained in the fork body; and a C-shaped scraper that is provided between the dust seal and the oil seal and makes sliding contact with the outer circumference of the inner tube;

wherein the scraper is in direct contact with both the dust seal and the oil seal so as to receive forces therefrom to suppress diameter expansion.

2. The front fork according to claim 1, wherein the scraper is in direct contact with both the dust seal and the oil seal so as to receive forces therefrom and is fixed to the outer tube in an axial direction.

3. The front fork according to claim 1, wherein a surface of the scraper and a surface of the dust seal match and abut each other, and another surface of the scraper and a surface of the oil seal match and abut each other.

4. The front fork according to claim 1, wherein meshing portions in circumferential ends of the scraper mesh with each other, are parallel with each other, and are inclined with respect to an axial direction of the scraper.

5. The front fork according to claim 1, wherein a convex portion is provided in one of meshing portions that are in circumferential ends of the scraper, the meshing portions meshing with each other, and a concave portion matching the convex portion is provided in another of the meshing portions.

6. The front fork according to claim 1, wherein meshing portions, in circumferential ends of the scraper, mesh with each other and are parallel with each other, and each of the meshing portions has only a portion, but not all, thereof inclined with respect to an axial direction of the scraper.

7. The front fork according to claim 1, wherein a dust seal side end portion of an outer ring portion of the scraper and an annular concave portion provided in an inner circumference of the dust seal match and abut each other, and an oil seal side end portion of the outer ring portion of the scraper and an annular trench provided in an inner circumference of the oil seal match and abut each other.

8. The front fork according to claim 1, wherein the scraper and the oil seal are disposed in that stated order on a completely straight line, the completely straight line being perpendicular to a longitudinal axis of the inner tube.

9. The front fork according to claim 1, wherein the scraper and the dust seal are disposed in that stated order on a first completely straight line, the first completely straight line being perpendicular to a longitudinal axis of the inner tube.

10. The front fork according to claim 9, wherein the scraper and the oil seal are disposed in that stated order on a second completely straight line, the second completely straight line being perpendicular to the longitudinal axis of the inner tube.

11. The front fork according to claim 1, wherein the suppressed diameter expansion is that of the scraper.

* * * * *